United States Patent [19]

Karnofsky et al.

[11] 4,359,417

[45] Nov. 16, 1982

[54] PROCESS FOR EXTRACTING OLEAGINOUS SEED MATERIALS PARTICULARLY COTTONSEED WITH AQUEOUS ALCOHOL

[75] Inventors: George B. Karnofsky, Pittsburgh; Roger J. Hansotte, Butler, both of Pa.

[73] Assignee: Dravo Corporation, Pittsburgh, Pa.

[21] Appl. No.: 238,034

[22] Filed: Feb. 25, 1981

[51] Int. Cl.[3] .............................................. A23J 1/14

[52] U.S. Cl. ................................. 260/123.5; 426/656

[58] Field of Search ..................................... 260/123.5

[56] References Cited

U.S. PATENT DOCUMENTS

| | | | |
|---|---|---|---|
| 3,816,389 | 6/1974 | Mihara et al. | 260/123.5 |
| 4,144,229 | 3/1979 | Karnofsky | 260/123.5 |
| 4,219,470 | 8/1980 | Karnofsky | 260/123.5 |
| 4,279,811 | 7/1981 | Gray et al. | 260/123.5 |

*Primary Examiner*—Howard E. Schain

*Attorney, Agent, or Firm*—Louis E. Marn; Elliot M. Olstein

[57] ABSTRACT

There is disclosed a process for extracting oleaginous seed material consisting in part of solubles comprising carbohydrates, fatty-acids, non-oil lipids and oils with a less concentrated aqueous solution of a monohydric alcohol selective for the extraction of the solubles other than the carbohydrates and oil followed by a contact of the resulting particulate solids with a concentrated aqueous solution of a monohydric alcohol for the extraction of oil.

27 Claims, 4 Drawing Figures

PROCESS FOR EXTRACTING OLEAGINOUS SEED MATERIALS PARTICULARLY COTTONSEED WITH AQUEOUS ALCOHOL

FIELD OF THE INVENTION

This invention relates to the solvent extraction of oleginous seed materials, and more particularly to the solvent extraction of aflatoxin, gossypol and a semi-refined oil from full-fat cottonseed with aqueous alcohols, leaving as the residue meal of superior quality, substantially free of aflatoxin and unbound gossypol.

BACKGROUND OF THE INVENTION

Cottonseed meal and oil made by the extraction of partially dehulled cottonseed with hexane are widely used. However, cottonseed oil is difficult to refine; and cottonseed meal often sells at a disadvantage compared with soybean meal, and at times cannot be used at all. There are two problems:

(1) Cottonseed may be contaminated with aflatoxin. At the present time there is no commercially accepted process for removing or detoxifying aflatoxin.

(2) Cottonseed contains gossypol. This is a toxic pigment that must be either removed from or chemically bound in the meal.

In present practice, cottonseed is either prepressed and extracted with hexane, or extracted without prepressing. In the prepress method, cottonseed meats are moistened and heated before pressing to promote flow of the oil from the press cake. Under such conditions, the gossypol glands rupture, releasing into the oil much of the gossypol which is difficult to refine from the oil. The remainder of the gossypol is bound chemically in the meal.

For direct extraction, cottonseed is partially duhulled and flaked after little or not heating. Such preparation and subsequent extraction with hexane do not rupture the gossypol glands. The oil-free meats are then deliberately subjected to high moisture and temperature so as to rupture the glands. Under these conditions the gossypol reacts with and becomes chemically bound in the meal.

Neither of these processes is completely satisfactory. In both, the protein of the meal is badly denatured. Oil from prepressing is difficult and expensive to refine. Such pigments as diffuse from the meals into the miscella from hexane extraction are difficult to remove from the oil after the oil is desolventized. The pigments are best removed by refining undistilled or partly distilled miscella, an expensive process. Although retention, in direct extracted meals, of substantially all of the gossypol originally in the seed is not tolerated, it is generally agreed that so high a gossypol concentration is undesirable, even though the gossypol is bound.

It is known that aqueous alcohols are potentially good solvents for treating cottonseed. Relatively dilute aqueous alcohols dissolve aflatoxin, gossypol, fatty acids and non-oil lipids. Cottonseed oil has only limited solubility in cold concentrated alcohols or in hot dilute alchols.

It is known that aflatoxin can be extracted from full-fat cottonseed or hexane-extracted cottonseed meats with hot aqueous ethanol or isopropanol at concentrations stronger than 80 weight percent. However, this has not resulted in a commercial process for aflatoxin extraction. No process is available for extracting oil with aqueous alcohols following extraction of aflatoxin from full-fat cottonseed with aqueous alcohols. Extraction of aflatoxin with an aqueous alcohol from oil-free meats produced by hexane extraction is deemed too expensive.

It is known that gossypol glands are ruptured by aqueous alcohol solutions, and that gossypol is soluble in such solutions. When the temperature at which the glands are ruptured is low (below 140° F.), the gossypol remains largely in solution; as the temperature is increased, the gossypol is rapidly bound in the meal. However, there is no commercial process available by which such rupture and solubility is taken advantage of to remove gossypol.

In U.S. Pat. Nos. 4,144,229 and U.S. Pat. No. 4,219,470, assigned to the same assignee as the present invention, there are disclosed processes for extracting carbohydrates and non-oil lipids from oilseeds, particularly soybeans, leaving a residue of high-protein flour or concentrate. In such processes, there are generally four sequential steps in which the oilseed is countercurrently treated with aqueous solutions of a monohydric alcohol, such as ethanol or isopropanol:

In the first step, carbohydrates and non-oil lipids are extracted with dilute alcohol. For example, if the alcohol is ethanol, a preferred concentration is 50–70 weight percent. At such ethanol concentration, carbohydrates and non-oil lipids are selectively extracted; protein and oil are only sparingly soluble.

In the second step, the dilute alcohol in the seed material from the first step is displaced with aqueous alcohol of maximum feasible concentration. If the alcohol is ethanol, the maximum concentration that can be made by practical distillation without special means is about 92 weight percent. The concentration of the ethanol available for displacing the dilute ethanol in the second step is about 90–91 weight percent.

In the third step, the seed material from the second step is further extracted with concentrated alcohol at or near its boiling point. Under such conditions, oil is sufficiently soluble to make feasible a process in which oil-saturated miscella from the third step is cooled to precipitate oil, and the lean miscella is recycled to the third step extraction. The amount of miscella circulating through the third step must be at least sufficient to dissolve all of the oil that enters with the seed material.

In the fourth step, extraction of the seed material leaving the third step, which is still not completely free of oil, is completed by contacting the seed material with distilled alcohol, 92 weight percent if ethanol.

It is an important advantage of the four-step process outlined above that the oil produced in the third step is semi-refined. This is attributed to the removal in the first step of carbohydrates and non-oil lipids which otherwise would precipitate with the oil in the third step.

A protein flour or concentrate and semi-refined oil can be made from full-fat cottonseed by this process. However, there is a need for a process that can produce cottonseed meal, with unenhanced or only slightly enhanced protein content, that is free of aflatoxin, is free of unbound gossypol, has a minimum of bound gossypol and has protein of high solubility, while producing semi-refined oil.

In considering a four-step process for extracting cottonseed with minimum extraction of carbohydrates, there was no basis for estimating the maximum alcohol concentration permissible in the first step which would remove enough carbohydrates and non-oil lipids to assure production of semi-refined oil in the third step. The equivalent of 70 weight percent ethanol would certainly extract too much carbohydrates in the first step; omission of the first step entirely would likely result in poor oil.

OBJECTS OF THE INVENTION

It is an object of the present invention to provide a novel process for extracting aflatoxin-containing oleaginous seed materials using aqueous solutions of an alcohol as solvents for aflatoxin, pigments, fatty acids, non-oil lipids and (separately) semi-refined oil, with minimum carbohydrate extraction.

Another object of the present invention is to provide an improved process for extracting aflatoxin-containing oleaginous seed materials with aqueous solutions of an alcohol to produce as residue meal and animal feed substantially free of aflatoxin.

Another object of the present invention is to provide a novel process for extracting aflatoxin, gossypol, fatty acids, non-oil lipids and (separately) semi-refined oil from full-fat or partially defatted cottonseed, using as solvents aqueous solutions of an alcohol.

Still another object of the present invention is to provide a novel process for extracting oleaginous seed materials using aqueous solutions of an alcohol as solvents for pigments, fatty acids, non-oil lipids and (separately) semi-refined oil, with minimum carbohydrate extraction.

A further object of the present invention is to provide a novel process for extracting full-fat or partially defatted cottonseed using aqueous solutions of an alcohol as solvents for gossypol, fatty acids, non-oil lipids and (separately) semi-refined oil with minimum carbohydrate extraction, to produce as residue meal an animal feed with reduced bound gossypol and substantially no free gossypol.

SUMMARY OF THE INVENTION

These and other objects of the present invention are achieved by contacting particles of oleaginous seed material, consisting in part of solubles comprising carbohydrates, fatty acids, non-oil lipids and oils, with a less concentrated aqueous solution of a monohydric alcohol selective for the extraction of the solubles other than the carbohydrates and oil, followed by contact of the resulting particulate solids with a concentrated aqueous solution of the monohydric alcohol for the extraction of oil.

BRIEF DESCRIPTION OF THE INVENTION

A better understanding of the present invention as well as additional objects and advantages thereof will become apparent upon consideration of the detailed disclosure thereof which follows, in conjunction with the accompanying drawings, wherein.

DETAILED DESCRIPTION OF THE INVENTION

Figure 1:
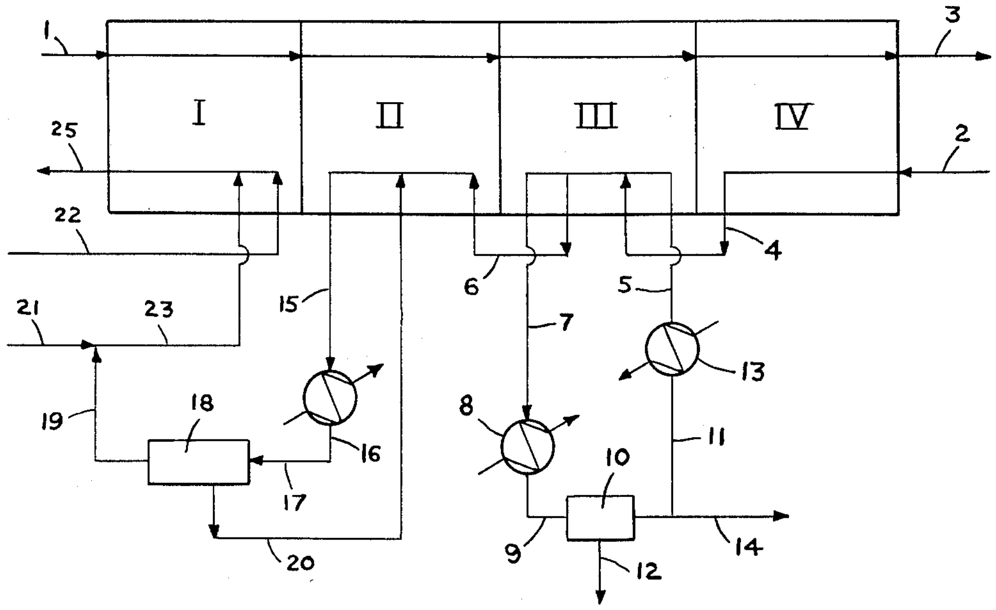
FIG. 1 is a schematic flow diagram of a four-step process by which gossypol can be extracted from cottonseed while simultaneously producing semi-refined oil and quality meal with a high content of soluble protein.

Although the present invention is hereinafter more fully described in application to full-fat cottonseed, it is to be understood that the present invention is equally applicable to aflatoxin-containing oil-seed materials, such as peanuts and press cakes. Although gossypol is a pigment unique to cottonseed, analogous pigments can be extracted from other oil seeds, to give oil and extracted meals with less color. In any case, initially selective extraction of fatty acids and non-oil lipids by relatively dilute alcohol, in which oil has little solubility, can be applied by these processes to make semi-refined oil and quality meal.

Although the present invention is hereinafter more fully described as applied to cottonseed flakes, it is to be understood that the present invention is equally applicable to press cakes, particularly press cakes with high oil content as prepared for the prepress-extraction process. In the prepress-extraction process, seeds of high oil content, such as peanuts, rapeseed and cottonseed, are cooked and lightly pressed so as to remove no more than about two-thirds of the oil; and the press cake is then solvent extracted.

The present invention resembles the disclosures in the foresaid U.S. Pat. Nos. 4,114,229 and 4,219,470. However, whereas it was the object of such disclosures to produce a protein concentrate of flour by extracting in a first step a considerable portion of the carbohydrates in the oleaginous seed material, it is one of the objects of the present invention to minimize carbohydrate extraction, which is accomplished by changing the concentration range (for ethanol) of 50–70 weight percent, optimum for carbohydrate extraction, to the range of 80–90 weight percent, in which little carbohydrate is extracted. In either case, it is desirable that a minimum of oil be extracted into the "dilute" alcohol. Although more oil is extracted by 80–90 weight percent than by 50–70 weight percent ethanol, the solubility of oil at a temperature in the neighborhood of 110° F. is very small in either concentration range. Likewise the solubility of fatty acids, non-oil lipids, aflatoxin and gossypol in aqueous ethanol in the range of 80–90 weight percent is high, so that the aflatoxin and gossypol can be selectively separated from oil by extraction.

The experimental work described in the examples which follow was performed with commerical full-fat cottonseed flakes made with a minimum of heating prior to flaking. This is of importance because, as will become apparent from the results illustrated by the examples, it is possible by one of the processes of this invention to make cottonseed meal with very high protein solubility. As hereinbefore explained, processes now used for extracting oil from cottonseed cause denaturation of protein. In every process now in use, prepared seed is treated at high temperature and high moisture content in order to rupture gossypol glands and promote the detoxifying reaction of gossypol with some of the ingredients of the meals. Consequently, the cottonseed meal with low gossypol content and high soluble protein content which can be made by the present invention is superior to cottonseed meal now on the market.

Referring now to FIG. 1, cottonseed flakes in line 1 are introduced at the beginning of Step I and are passed sequentially through steps I, II, III and IV. Hot concentrated aqueous alcohol in line 2, particularly 92% ethanol at or near its boiling point, is introduced into Step IV and flows sequentially through Steps IV, III, II and I, countercurrent to the cottonseed flakes which are withdrawn in line 3 from step IV. An enriched solvent stream or miscella is withdrawn from Step I in line 25. In Step IV, partly extracted flakes from Step III are countercurrently extracted with hot solvent in line 2.

Oil dissolved in hot concentrated alcohol is withdrawn from step IV in line 4 and is introduced into Step III at a point downstream of the entry through line 5 of recycled concentrated alcohol. It is established good practice to introduce a stream into an extraction system at a point where the concentration of solute in the stream matches that of the miscella. Because the concentration of alcohol in Step IV is slightly higher than the concentration of alcohol in Step III, extraction of oil is significantly faster in Step IV; so the concentration of oil in line 4 is higher than the concentration of oil in line 5.

The combined streams in lines 4 and 5 extract oil in Step III. The net forward flow of miscella is removed in line 6 from the miscella stream in Step III at a point upstream from the end of the liquid path. Since the oil concentration in the miscella flowing through Step II is lower than the oil concentration in the miscella flowing through Step III, there is no point in saturating with oil the miscella in line 6. As has been earlier stated, the miscella flow in line 7 must be sufficient to dissolve all of the oil in the flakes in line 1. Enough retention time and countercurrency are provided in Step III to saturate or nearly saturate with oil the miscella withdrawn in line 7. The miscella in line 7 is cooled in a heat exchanger 8 to form a mixture in line 9 of precipitated oil and lean miscella passed to separator 10. The precipitated oil is removed from separator 10 by line 12. Lean miscella withdrawn by line 11 is reheated to extraction temperature in heat exchanger 13 and is recycled to Step III through line 5. Although it has been our experience that the flow in line 6 is adequate to purge the recycling stream of anything that might precipitate with the oil, an additional purge line 14 can be provided if found necessary.

In Step II, concentrated alcohol from line 6 displaces dilute alcohol in the flakes of Step I. As the stream flowing from right to left in Step II becomes less concentrated in alcohol, the solubility of oil therein decreases, and oil precipitates. We find that oil so precipitated redeposits on the flakes and is passed to Step III for eventual removal in line 12. Nevertheless, there is still some oil in the miscella withdrawn from Step II in line 15.

The description thus far of the operation of Steps II, III and IV of FIG. 1 applies equally well to the operations of the other Figures. For brevity, such description will not be repeated. The numerals of FIG. 1 are applied to the corresponding items of FIGS. 2, 3 and 4.

The specific object of the process of FIG. 1 is to extract as much gossypol as possible before the gossypol reacts with the cottonseed material. This requires that Step I be operated at as low a temperature as feasible, e.g. between 90° to 150° F., preferably 110° F. for ethanol solutions. At this temperature, and with aqueous ethanol in the concentration range of from 80 to 90 weight percent, gossypol can be extracted along with fatty acids and non-oil lipids with minimum of the carbohydrates.

Referring again to FIG. 1, miscella in line 15 is cooled in heat exchanger 16 and the mixture of precipitated oil and lean miscella is introduced into separator 18. An oil phase in line 20 and a lean miscella in line 19 are withdrawn from separator 18. The alcohol concentration of the lean miscella in line 19 is usually higher than desired for Step I. Consequently, the lean miscella in line 19 is diluted with water in line 21 to form a dilute alcohol of the desired concentration, which is introduced into Step I by line 23. Since, for satisfactory removal of gossypol, fatty acids and non-oil lipids in Step I, more solvent may be required than is available in line 23, additional dilute alcohol of the desired concentration may be added in line 22. As illustrated, solvent in line 22 is introduced at the right hand end of Step I; solvent in line 23 is introduced downstream of line 22. Since there is a notable amount of solute in line 23, the solvent in line 23 is introduced downstream at a point where its solute concentration matches that of the miscella in Step I. Such solute is only to a small extent the consequence of further extraction in Step II. Most of the solute is squeezed from the flakes as the flakes shrink in the more concentrated alcohol in Step II.

There has been disclosed and used a great variety of equipment and methods for extracting particulate oleaginous seed materials. In less preferred methods, particulates are immersed in and conveyed through the solvent, either in countercurrent stages, each consisting of a soaker followed by solids-liquid separation, or in a column or conveyor in which there is counterflow of particulates and solvent. When the particulates are flakes, there is considerable breakage and fines in the miscella which are troublesome. It has been the experience in the extraction of oilseeds that percolation extraction, defined as a process in which the particulates form beds through which solvent percolates, is superior to immersion extraction. The reasons are that the bed itself is an excellent filter for the miscella, that the spent particulates can be drained by gravity prior to desolventizing, that the bed affords efficient contact between particulates and solvent, and that there is practically no mechanical wear of the equipment.

Although the process of our invention may be practiced in any suitable countercurrently operated liquid-solids contractors used for washing or leaching, we prefer, based on the experience of the oilseed industry, to employ percolation extraction techniques. A commercially proven extractor particularly suited for the practice of our invention is the rotary extractor described in U.S. Pat. No. 2,840,459.

In such extractor, a rotor divided into sector cells rotates in a vapor-tight tank above stationary stage compartments. Each cell is open at the top and closed at the bottom by a hinged perforated door. Solids are fed continuously into each cell as it passes under a loading zone, and fall from the cell when its door opens above a discharge zone almost completely around the circle from the feed zone. Solvent is advanced counter to the direction of rotation by a series of stage pumps, which pump miscellas of gradually increasing concentration into distribution manifolds positioned over the free-draining beds formed in the cells.

Extraction of flakes in a percolation extractor can be faithfully simulated in the laboratory by percolating through a bed of flakes in a stationary vertical tube a succession of miscellas of decreasing concentration, corresponding to the miscellas collected in the stage compartments and pumped to the manifolds by each stage pump. To establish correct concentrations of the miscellas, a first batch of flakes is extracted with fresh solvent only, and the miscella draining from the bed is collected in successive measured cuts. The first cut, equivalent to final miscella, is discarded, and the other cuts are percolated in succession through a second batch of flakes, followed by an amount of fresh solvent whose ratio to flakes in the batch is the same as the ratio of solvent to flakes fed in the continuous process being simulated. After treating several batches of flakes, the concentrations of the miscella cuts reach a steady state characteristic of the operation of a continuous extractor.

Simulation of the complete process of FIG. 1 by extraction of successive batches is more complex. Nevertheless, the four-step process can be simulated by accumulating four sets of miscella cuts, advancing miscella from Step IV to III to II to I, and carrying out the cooling, mixing, recycling, and reheating shown in FIG. 1.

The parameters that determine the steady state in any one step of extraction are temperature, ratio of solvent to feed, and retention time. Simulation of the four-step process of FIG. 1 is more complex in that additional parameters must be selected, e.g. alcohol concentration and flow rate in lines 2 and 22, recycle solution flow in line 5, temperature of two-phase flow in line 9 and temperature and retention time in each of the four steps.

Example I illustrates the process of FIG. 1. This Example and the Examples that follow each of the subsequent Figures are included for the purpose of illustrating the invention; and it is to be understood that the scope thereof is not to be limited thereby.

EXAMPLE I

Full-fat cottonseed flakes, prepared for flaking with minimal heating, were extracted with aqueous ethanol in accordance with the herein described process of FIG. 1. The flakes contained 28.1 weight percent oil and 7.3 weight percent water. In a number of successive batches, the flakes were presoaked in a solution equivalent to that in line 25 for 10 minutes and then poured into a vertical glass tube closed at the bottom by a screen. Each batch was treated in immediate succession with aqueous ethanol solutions as described with reference to FIG. 1. Retention times in Steps I and III were 60 minutes; in Steps II and IV, 30 minutes each. Temperature in Step I was 110° F.; in Steps II, III and IV, 175° F. (boiling point). Water was added in line 21 to control the ethanol concentration in line 23 at 85 weight percent. Temperature in lines 11, 25 and 17 was 110° F. Relative to a flow of 100 pounds of flakes in line 1 of FIG. 1, the flow in lines 22, 25 and 11 was zero, 100 and 810, respectively.

When the steady state was reached, the various streams were measured as set forth in the following Table I:

TABLE I

| Lines | 3 | 7 | 12 | 20 | 21 | 25 | 2 |
|---|---|---|---|---|---|---|---|
| Flow (pounds) | 130 | 840 | 30 | 3 | 3 | 100 | 157 |
| Solute (wt. %) | — | — | — | — | 0 | 6.3 | — |
| Lipids (wt. %) | 1.2* | 5.1 | 91 | 91 | 0 | — | — |
| ETOH Conc. (wt. %) | — | 91 | — | — | 0 | 82 | 92 |
| Volatiles (wt. %) | 55.6 | — | 9 | 9 | — | — | — |
| Proteins (wt. %) | 44.1* | — | — | — | — | — | — |
| Protein solubility (%) | 70.5 | — | — | — | — | — | — |
| Free gossypol (%) | 0.019* | — | — | — | — | — | — |
| Total gossypol (%) | 0.291* | — | — | — | — | — | — |

*Dry Basis

NOTES:

(1) There was no need to add 85 weight percent alcohol in line 22. Since there is a continuous reduction in solvent held in the flakes as the flakes move from left to right and meet alcohol of increasing strength, there is a corresponding increase in miscella flow from right to left. Consequently, although solvent flow in line 2 was 157 pounds, flow in line 19 was measured at 190 pounds and flow in line 23 at 193 pounds. The solvent ratio of 1.93 in Step I was adequate without supplementation.

(2) Oil from line 12 has a neutral oil loss when refined of 2.1% (compared with 4 to 5% for hexane extracted oil). Free fatty acids were 0.3%; only traces of gossypol and non-oil lipids (phosphatides).

(3) The high solubility of the protein in the extracted flakes in line 3 can be accounted for as follows: Protein is denatured by contact with aqueous ethanol (and other aqueous alcohols). As the ethanol concentration is increased from 50 weight percent at constant temperature, the rate of denaturation is reduced. As the temperature is increased at constant concentration, denaturation is enhanced. At 110° F. and 85 weight percent ethanol in Step I, denaturation is slow. In Step II at 175° F. the alcohol concentration quickly increases, so denaturation is slow. In Steps III and IV at 175° F. and 91–92 weight percent ethanol, additional denaturation is negligible. Protein denaturation can be reduced even more if Step II is divided into two substeps, the first carried out at 110° F. and the second at 175° F. In this manner most of the dilute alcohol in the flakes is displaced at a low temperature, at which there is little protein denaturation. To do so, Step II is divided as disclosed in co-pending U.S. Application No. (P/31 86) assigned to the same assignee as the present invention.

(4) The temperature of Step I was low enough to permit extraction of most of the gossypol before the gossypol could be bound in the meal.

(5) At the low temperature of Step I little carbohydrate was extracted, as indicated by the low protein content of the extracted flakes.

Figure 2:
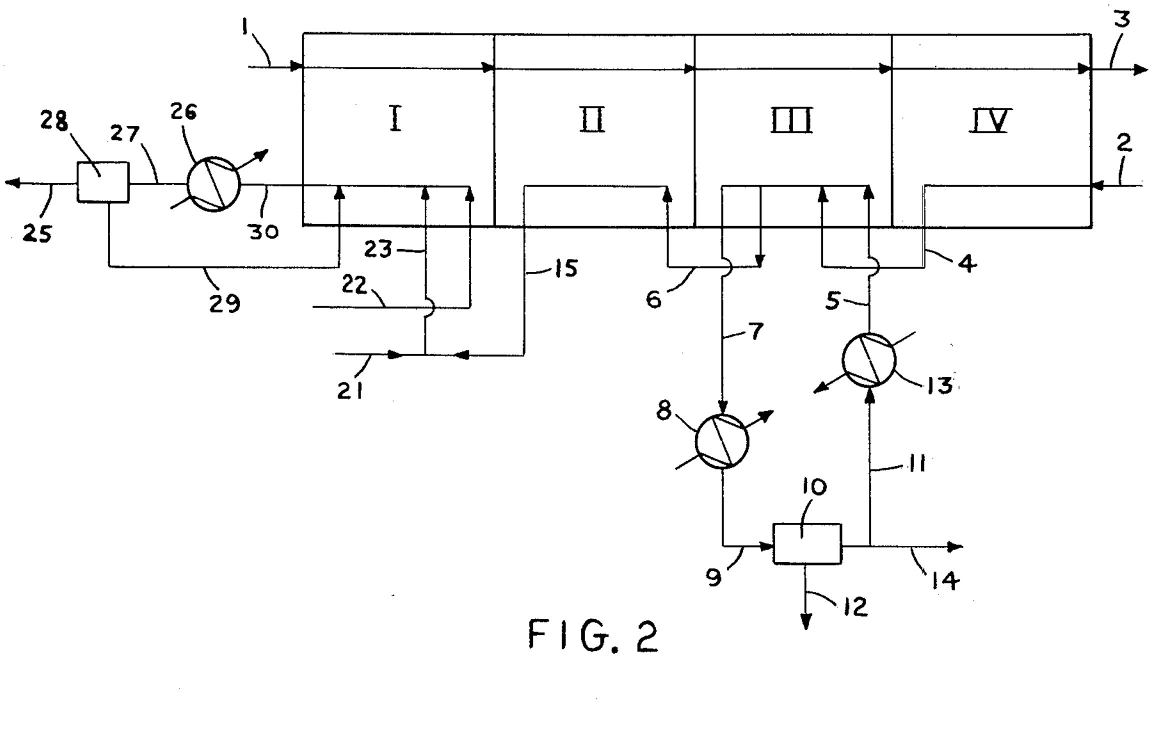
FIG. 2 is a schematic flow diagram of a four-step process by which aflatoxin can be extracted from cottonseed while simultaneously producing semi-refined oil and quality meal.

The process illustrated in FIG. 2 is specifically designed to extract aflatoxin without, however, extracting gossypol. It is well established that hot aqueous ethanol in the concentration range of 80–90 weight percent extracts aflatoxin. FIG. 2 shows how this is applied in the four-step process by changing only the temperature of Step I. Flows in Step II, III and IV are identical with those earlier explained for the process of FIG. 1. The differences between the process described by FIG. 2 and the process of FIG. 1 begin with the miscella leaving Step II in line 15. There is now no purpose in cooling the miscella in line 15. Consequently, the miscella in line 15 is introduced directly into Step I after being admixed in line 23 with water in line 21 so as to dilute the miscella to the alcohol concentration desired in Step I. It is to be understood that the water in line 21 and the solvent of the desired concentration in line 22 are preheated to the operating temperature, preferably near the boiling point, which for ethanol solutions is about 175° F. We have found that at this temperature the gossypol is rapidly bound to the meal. There is therefore little gossypol in line 30, which contains aflatoxin, fatty acids and non-oil lipids. Although the miscella in line 30 can be removed from the process at this point, in a preferred operation the miscella in line 30 is cooled in the heat exchanger 26 to form a mixture of oil and lean miscella passed in line 27 to the separator 28. An oil phase is recycled by line 29 to Step I, with net miscella leaving the process in line 25. In this manner, a small amount of oil in line 30 can be recycled to the extractor for recovery as semi-refined oil in line 12, as hereinabove disclosed, i.e. by precipitation onto the flakes.

EXAMPLE 2

The full-fat cottonseed flakes as described in Example 1 were extracted with aqueous ethanol in accordance with the herein described process of FIG. 2. Although such flakes were free of aflatoxin, there is no doubt that aflatoxin would have been extracted in Step I, since they were treated as prescribed in the literature (J. Am. Oil Chem. Soc. 54, 242A (1977)). In a number of successive batches, the flakes were presoaked in a solution equivalent to that in line 25 for 10 minutes and then poured into a vertical glass tube closed at the bottom by a screen. Each batch was treated in immediate succession with aqueous ethanol solutions as described with reference to FIG. 2. Retention time in Step I was 45 minutes; in Step III, 60 minutes; in Steps II and IV, 30 minutes each. Temperature in all steps was 175° F. (boiling point). Water was added in line 21 to control the ethanol concentration in line 23 to 85 weight percent. Temperature in line 11, 25 and 27 was 110° F. Relative to a flow of 100 pounds of flakes in line 1 of FIG. 2, the flow in lines 22, 25 and 11 was zero, 100 and 810 respectively.

When the steady state was reached, the various streams were measured as set forth in the following Table II:

TABLE II

| Lines | 3 | 7 | 12 | 29 | 21 | 25 | 2 |
|---|---|---|---|---|---|---|---|
| Flow (pounds) | 125 | 840 | 30 | 2 | 3 | 100 | 153 |
| Solute (wt. %) | — | — | — | — | 0 | 8.3 | — |
| Lipids (wt. %) | 0.5* | 5.1 | 91 | 91 | 0 | — | — |
| ETOH Conc. (wt. %) | — | 91 | — | — | 0 | 82 | 92 |
| Volatiles (wt. %) | 55.6 | — | 9 | 9 | — | — | — |
| Proteins (wt. %) | 46.9* | — | — | — | — | — | — |
| Protein solubility (%) | 45.2 | — | — | — | — | — | — |
| Free gossypol (%) | 0.026* | — | — | — | — | — | — |
| Total gossypol (%) | 0.8* | — | — | — | — | — | — |

*Dry Basis

NOTES:

(1) In this example, and in all the others, the parameters of the process were identical with those of Example 1; namely, 100 pounds in line 1, 100 pounds in line 25, 85 weight percent ethanol in line 23, 110° F. in line 11. These parameters were kept the same in order to make the results more easily comparable. However, 85 weight percent ethanol in line 23 and 100 pounds in line 25 are not necessarily the optimum for any of the processes; nor are the retention times chosen for these examples.

(2) Oil from line 12 had a neutral oil loss when refined of 1.2%. Free fatty acids were 0.3%; only traces of gossypol and non-oil lipids (phosphatides).

(3) As expected, total gossypol in the extracted flakes was higher, percent protein higher and protein solubility lower than in the extracted flakes of Example 1.

Figure 3:
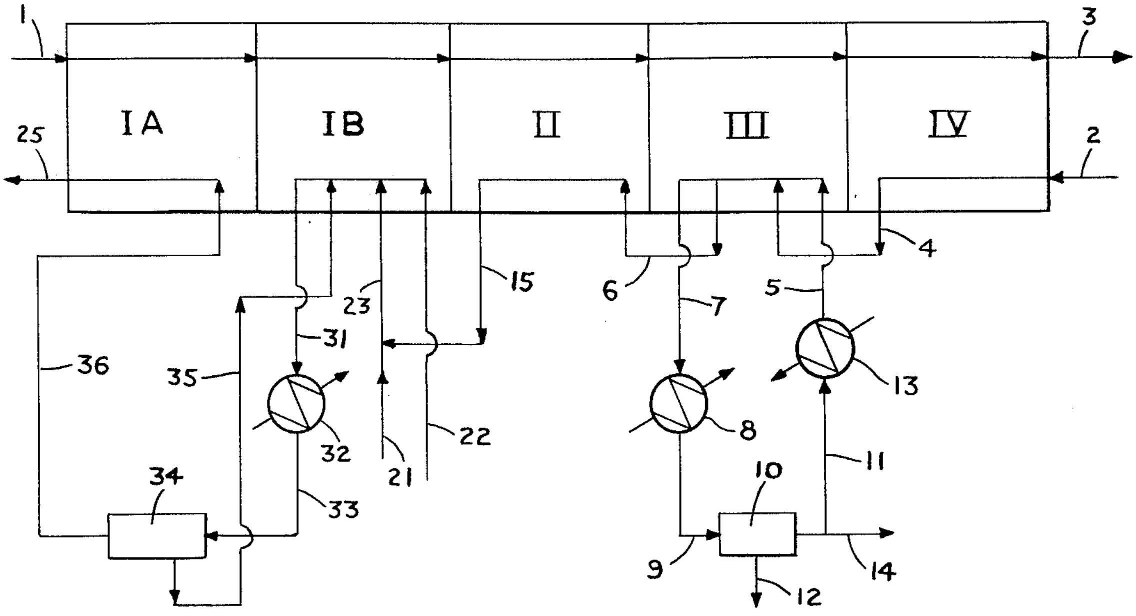
FIG. 3 is a schematic flow diagram of a five-step process, by which both aflatoxin and gossypol can be extracted from cottonseed, while simultaneously producing semirefined oil and quaiity meal.

It is apparent, from a comparison of the results of Examples, 1 and 2, that a considerable portion of the gossypol can be extracted if Step I is carried out at a low temperature. It is also apparent that when Step I is carried out at high temperature the gossypol is immediately bound. FIG. 3 illustrates a process by which both gossypol and aflatoxin can be removed. In this process, Step I is divided into two parts, IA and IB, in each of which the aqueous alcohol used for extraction is too dilute to dissolve much of the oil. Step IA is carried out at low temperature and Step IB at high temperature, thus removing the gossypol first, before it can be fixed, the next removing the aflatoxin.

As before, the differences between the process of FIG. 3 and the process illustrated by FIG. 1 begin at the end of Step II, with the hot, partially diluted alcohol solution leaving in line 15. As before, the alcohol stream in line 15 is diluted with water in line 21 to form an alcohol solution in line 23 of the concentration desired for extraction in Steps IA and IB. Additional alcohol of said concentration may be added, if required, in line 22. Miscella from Step IB in line 31, containing aflatoxin, fatty acids and non-oil lipids, is cooled in heat exchanger 32 to precipitate oil. The oil suspension in line 33 is separated in separator 34 into a miscella stream in line 36 and an oil phase in line 35. The oil phase in line 35, which contains components other than oil and is not of the high quality expected of such process, is therefore recycled to the end of Step IB where the oil phase is deposited onto the flakes and thus carried to Step III, to become a part of the stream of high quality oil in line 12. The miscella in line 36 is the solvent for gossypol in Step IA. The miscella in line 25 contains gossypol, aflatoxin, fatty acids and non-oil lipids.

EXAMPLE 3

Full-fat cottonseed flakes were extracted with aqueous ethanol in accordance with the hereindescribed process of FIG. 3. Such flakes were from an experimental batch and had an unusually low hull content. Consequently, the protein content was high. Since flake thickness varied between 0.015–0.30 inches, good extraction of oil could not be expected. In a number of successive batches, the flakes were presoaked in a solution equivalent to that in line 25 for 10 minutes and then poured into a vertical glass tube closed at the bottom by a screen. Each batch was treated in immediate succession with aqueous ethanol solutions as described with reference to FIG. 3. Retention time in Steps IA, IB, II and IV were each 30 minutes; in Step III, 60 minutes. Temperature in all steps except IA was 175° F. (boiling point); in Step IA, 110° F. Water was added in line 21 to control the ethanol concentration in line 23 to 85 weight percent. Temperature in lines 11, 25 and 33 was 110° F. Relative to a flow of 100 pounds of flakes in line 1 of FIG. 3, the flow in lines 22, 25 and 11 was zero, 100 and 810, respectively.

When the steady state was reached, the various streams were measured as set forth in the following Table III:

TABLE III

| Lines | 3 | 7 | 12 | 35 | 21 | 25 | 2 |
|---|---|---|---|---|---|---|---|
| Flow (pounds) | 124 | 840 | 30 | 2 | 3 | 100 | 151 |
| Solute (wt. %) | — | — | — | — | 0 | 8.5 | — |
| Lipids (wt. %) | 3.0* | 5.1 | 91 | 91 | 0 | — | — |
| ETOH Conc. (wt. %) | — | 91 | — | — | 0 | 82 | 92 |
| Volatiles (wt. %) | 55.6 | — | 9 | 9 | — | — | — |
| Proteins (wt. %) | 51.6* | — | — | — | — | — | — |
| Protein solubility (%) | 50.6 | — | — | — | — | — | — |
| Free gossypol (%) | 0.03* | — | — | — | — | — | — |
| Total gossypol (%) | 0.45* | — | — | — | — | 0.98 | — |
| Free Fatty Acids (%) | — | — | 0.012 | — | — | 3.67 | — |

*Dry Basis

NOTES:

(1) Oil from line 12 had a neutral oil loss when refined of 0.12%. Free fatty acids were 0.013%; only traces of gossypol and non-oil lipids (phosphatides).

(2) The gossypol is mostly in the miscella, as expected from the results of Example 1.

(3) As expected, protein solubility is a little better than that found in Example 2. In Example 2, the retention time in Step I, the protein denaturing step at 175° F., was 45 minutes; in this Example 3, only 30 minutes.

Figure 4:
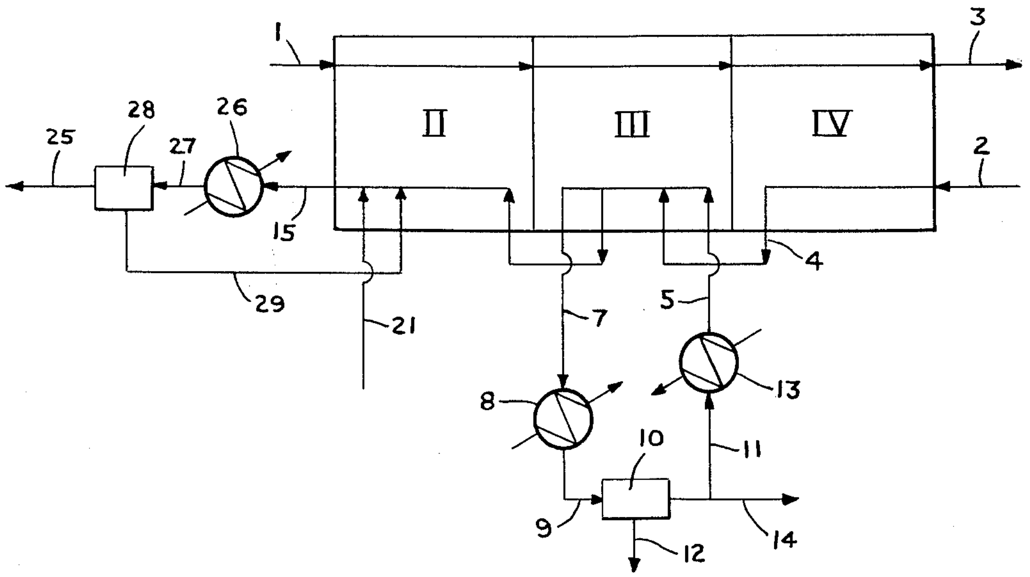
FIG. 4 is a schematic flow diagram of a three-step process by which semi-refined oil is produced even though little gossypol is removed.

The process portrayed by FIG. 4 is employed when neither aflatoxin nor gossypol is to be extracted, but enough fatty acids and non-oil lipids are to be extracted to assure a semi-refined oil in line 12. This is done by omitting Step I of FIG. 2 entirely or reducing it to the equivalent of a single stage of extraction.

Beginning, as before, with line 15, the miscella in it is cooled in heat exchanger 26 to precipitate an oil phase. The mixed phases in line 27 are separated by separator 28. The miscella leaves the process in line 25. The oil phase recycles to Step II through line 29. Water may be added through line 21 to reduce the alcohol concentration in the miscella before it leaves Step II. Since water added in this way also dilutes the alcohol in the flakes moving from left to right in Step II, the effect is to reduce the alcohol concentration at all points in Step II, and to increase the likelihood that fatty acids and non-oil lipids will be extracted.

EXAMPLE 4

The full-fat cottonseed flakes as described in Example 3 were extracted with aqueous ethanol in accordance with the herein described process of FIG. 4. In a number of successive batches, the flakes were presoaked in a solution equivalent to that in line 25 for 10 minutes and then poured into a vertical glass tube closed at the bottom by a screen. Each batch was treated in immediate succession with aqueous ethanol solutions as described with reference to FIG. 4. Retention time in Step II was 45 minutes; in Step III, 60 minutes; and in Step IV, 30 minutes. Temperature in all steps was 175° F. (boiling point). Temperature in lines 11, 25 and 27 was 110° F. Relative to a flow of 100 pounds of flakes in line 1 of FIG. 4, the flow in lines 21, 25 and 11 was 3, 100 and 810, respectively.

When the steady state was reached, the various streams were measured as set forth in the following Table IV:

TABLE IV

| Lines | 3 | 7 | 12 | 20 | 21 | 25 | 2 |
|---|---|---|---|---|---|---|---|
| Flow (pounds) | 130 | 840 | 30 | 2 | 3 | 100 | 157 |
| Solute (wt. %) | — | — | — | — | 0 | 6.1 | — |
| Lipids (wt. %) | 2.6* | 5.1 | 91 | 91 | 0 | — | — |
| ETOH Conc. (wt. %) | — | 91 | — | — | 0 | 82 | 92 |
| Volatiles (wt. %) | 55.6 | — | 9 | 9 | — | — | — |
| Proteins (wt. %) | 49.8* | — | — | — | — | — | — |
| Protein solubility (%) | 50.2 | — | — | — | — | — | — |
| Free gossypol (%) | 0.045* | — | — | — | — | — | — |
| Total gossypol (%) | 0.44* | — | — | — | — | 0.81 | — |
| Free Fatty Acids (%) | — | — | 0.014 | — | — | 3.02 | — |

*Dry Basis

NOTES:

(1) Oil from line 12 had a neutral oil loss when refined of 0.91% (compared with 4 to 5% for hexane extracted oil). Free fatty acids were 0.015%; only traces of gossypol and non-oil lipids (phosphatides).

(2) Extraction of gossypol and free fatty acids was better than expected. When there is no aflatoxin to be extracted, the process of this Example 4 will likely be the most attractive commercially.

Although the experiments herein described employed aqueous ethanol solutions, the same could have employed methanol or isopropanol solutions. The use of methanol or isopropanol solutions have both advantages and disadvantages compared with ethanol solutions.

It is known that "dilute" isopropanol solutions extract gossypol, aflatoxin, fatty acids and non-oil lipids in the same way as herein described for ethanol. The two solvents differ primarily in their dissolving power for oil, which is far more soluble in isopropanol solutions. The equivalent of 92 weight percent ethanol (95 volume percent ethanol of commerce) is 87.7 weight percent isopropanol (91 volume percent isopropanol of commerce). Solubility of cottonseed oil at 170° F. in 87.7 weight percent isopropanol is 16 weight percent; at 110° F., the solubility is 4 weight percent. Consequently, the flow required in line 11 of any of the examples using isopropanol would be only 240 pounds instead of the 810 pounds of the ethanol solution. This is a considerable improvement, since less heat is required to reheat the liquid in line 11 prior to its introduction into Step III. On the other hand, since oil is more soluble in dilute isopropanol solutions than in dilute ethanol solutions, the isopropanol concentration in Step I to minimize oil in the miscella in line 25 would have to be 75 weight percent or less, compared with the 85 weight percent ethanol of the examples. Consequently, there would be an undesirable increase in the amount of carbohydrates in the miscella leaving the process in line 25.

It is entirely likely that an optimum solvent is a mixture of aqueous ethanol and isopropanol. Although no experiments with such mixtures are described herein, this disclosure comprises the utilization, as solvents in the processes described, of aqueous methanol, aqueous ethanol, aqueous isopropanol or mixtures thereof.

Although this invention has been described in its application to cottonseed, it has more general application which will be apparent to those who are familiar with oilseeds. Like cottonseed, other seeds contain free fatty acids, non-oil lipids and often pigments which it is advantageous to extract from the prepared seed before oil is extracted. Oil so produced is semi-refined. In most cases it is also desired to minimize carbohydrate extraction. This can be accomplished, as herein demonstrated, by employing in Step I an aqueous alcohol of the right concentration. For example, 85 percent ethanol extracts very little carbohydrate (soluble only at lower concentrations), selectively extracts fatty acids, non-oil lipids and pigments, and extracts little oil (soluble only at higher concentrations) from any oilseed.

While the invention has been described in connection with many exemplary embodiment thereof, it will be understood that many modifications will be apparent to those of ordinary skill in the art; and that this application is intended to cover any adaptation or variation thereof. Therefore, it is manifestly intended that this invention be only limited by the claims and the equivalents thereof.

What is claimed:

1. In a process for forming residue meal by extracting oil from an oleaginous seed material consisting in part of components comprising carbohydrates, fatty acids, non-oil lipids and oil wherein the oil is extracted last by a concentrated aqueous solution of a monhydric alcohol, the improvement comprising first contacting said oleaginous seed material with an aqueous solution of said monohydric alcohol less concentrated than said concentrated aqueous solution thereof, and at a concentration to form a miscella by selectively extracting substantially all of said components other than said carbohydrates and oil from said oleaginous seed material with minimal extraction of said carbohydrates.

2. The process as defined in claim 1 wherein said monohydric alcohol is selected from the group consisting of methanol, ethanol, isopropanol and mixtures thereof.

3. The process as defined in claim 2 wherein said monohydric alcohol is ethanol.

4. The process as defined in claim 1 wherein oleaginous seed material is cottonseed or cottonseed press cake.

5. The process as defined in claim 4 wherein said cottonseed or cottonseed press cake includes gossypol as a component extractable by said less concentrated monohydric alcohol solution.

6. The process as defined in claim 5 wherein said contacting is effected at a temperature between 90° to 150° F.

7. The process as defined in claim 6 wherein said less concentrated monohydric alcohol solution is 80 to 90 weight percent ethanol.

8. The process as defined in claim 1 wherein aflatoxin is a component extractable by said less concentrated monohydric alcohol solution and the temperature of said contacting is 160° to 180° F.

9. The process as defined in claim 8 wherein said less concentrated monohydric alcohol solution is 80 to 90 weight percent ethanol.

10. The process as defined in claim 4 wherein said cottonseed or cottonseed press cake contains both gossypol and aflatoxin as components extractable by said less concentrated monohydric alcohol solution and said contacting is effected sequentially: a first contacting, at a temperature between 90° to 150° F. to preferentially extract said gossypol; and a second contacting, at a temperature between 160° to 180° F. to extract aflatoxin.

11. The process as defined in claim 10 wherein said less concentrated monohydric alcohol solution is 85 weight percent ethanol, the temperature of said first contacting is 110° F. and the temperature of said second contacting is 175° F.

12. The process as defined in claim 1 wherein said contacting is effected at a temperature above 110° F. the process further comprising cooling said miscella to form an oil phase and recycling said oil phase to said contacting.

13. A process for extracting oil from oleaginous seed material consisting in part of components comprising carbohydrates, fatty acids, non-oil lipids and oil, which comprises:

(a) particulating said oleaginous seed material to form extractable particles;

(b) contacting said particles with a less concentrated aqueous solution of a monohydric alcohol to selectively extract all of said components othe than said carbohydrates and oil with minimal extraction of said carbohydrates an oil;

(c) separating a miscella from the particles of step (b);

(d) contacting said particles of step (c) with a concentrated aqueous solution of said monohydric alcohol at a temperature at or near the boiling point to displace said less concentrated aqueous solution of said monohydric alcohol therefrom;

(e) separating a miscella from the particles of step (d);

(f) contacting said particles of step (e) with a concentrated aqueous solution of said monohydric alcohol at a temperature at or near the boiling point to extract substantially all of said oil;

(g) separating an oil-enriched miscella from the particles of step (f);

(h) cooling said oil-enriched miscella of step (g) to separate a solvent phase from an oil phase;

(i) returning said solvent phase to step (f);

(j) withdrawing said oil phase from the process; and (k) desolventizing the particles resulting from step (g) to yield a residue meal including unextracted carbohydrates.

14. The process as defined in claim 13 wherein said monohydric alcohol is selected from the group consisting of methanol, ethanol, isopropanol and mixtures thereof.

15. The process as defined in claim 14 wherein said monohydric alcohol is ethanol.

16. The process as defined in claim 13 wherein said oleaginous seed material is cottonseed or cottonseed press cake.

17. The process as defined in claim 16 wherein said cottonseed or cottonseed press cake includes gossypol as a component extractable by said less concentrated monohydric alcohol solution.

18. The process as defined in claim 17 wherein step (b) is effected at a temperature between 90° to 150° F.

19. The process as defined in claim 18 wherein said less concentrated aqueous solution of said monohydric alcohol is 80 to 90 weight percent ethanol.

20. The process as defined in claim 13 wherein aflatoxin is a component extractable by said less concentrated aqueous solution in step (b) and temperature of step (b) is 160° to 180° F.

21. The process as defined in claim 20 wherein said less concentrated aqueous solution of said monohydric alcohol is 80 to 90 weight percent ethanol.

22. The process as defined in claim 16 wherein said cottonseed or cottonseed press cake contains both gossypol and aflatoxin as components extractable by said less concentrated aqueous solution of said monohydric alcohol and step (b) is effected sequentially: first, at a temperature between 90° and 150° F. to preferentially extract said gossypol; and second, at a temperature between 160° and 180° F. to extract said aflatoxin.

23. The process as defined in claim 22 wherein said less concentrated aqueous solution of said monohydric alcohol is 85 weight percent ethanol and said sequential temperatures are 110° F. and 175° F.

24. The process as defined in claim 13 wherein step (b) is effected at a temperature above 110° F. and the miscella of said components separated in step (c) is cooled to separate a solvent phase and an oil phase; and said oil phase is recycled to step (b).

25. The process as defined in claim 13 wherein water is added to said miscella separated in step (e), the mixture comprising at least a portion of said less concentrated aqueous solution of said monohydric alcohol of step (b).

26. The process as defined in claim 25 wherein the remaining portion of said less concentrated aqueous solution of said monohydric alcohol comprises a distillate from the distillation of the miscella separated in step (c).

27. The process as defined in claim 26 wherein said miscella withdrawn from step (f) constitutes said concentrated aqueous solution of said monohydric alcohol of step (d).

* * * * *

UNITED STATES PATENT AND TRADEMARK OFFICE

CERTIFICATE OF CORRECTION

PATENT NO. : 4,359,417

DATED : NOVEMBER 16, 1982

INVENTOR(S) : GEORGE B. KARNORSKY and ROGER J. HANSOTTE

It is certified that error appears in the above-identified patent and that said Letters Patent is hereby corrected as shown below:

Col. 1, line 37, "not" should be -- no --;
line 53, "not" should be -- now --;

Col. 4, line 34, "of" should be -- or --;
line 53, correct "commerical" to -- commercial --;

Col. 8, line 28, "has" should be -- had --;

Col. 10, line 38, "the" , first occurrence, should read -- and --.

Signed and Sealed this

*Thirty-first* Day of *January 1984*

[SEAL]

*Attest:*

GERALD J. MOSSINGHOFF

*Attesting Officer* *Commissioner of Patents and Trademarks*